United States Patent Office 3,421,126
Patented Jan. 7, 1969

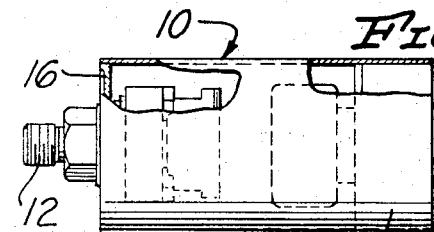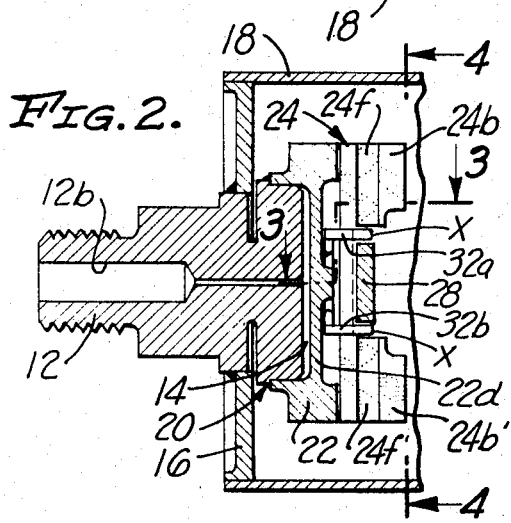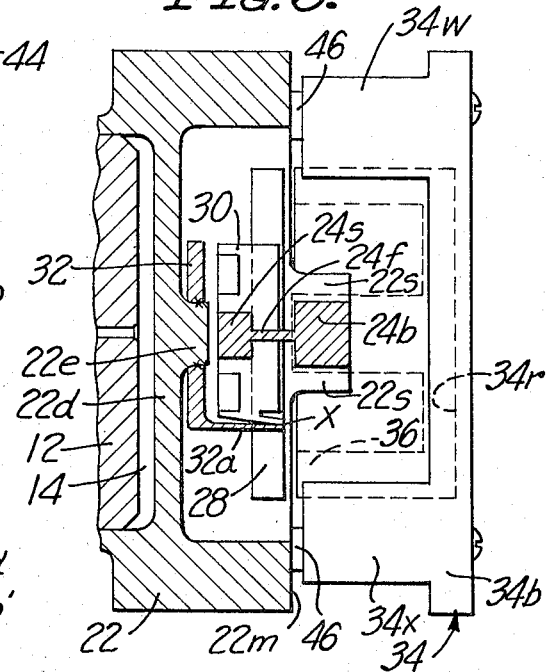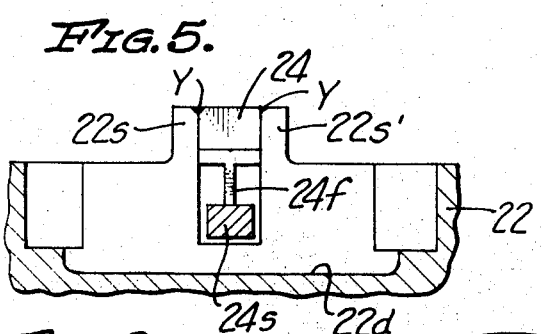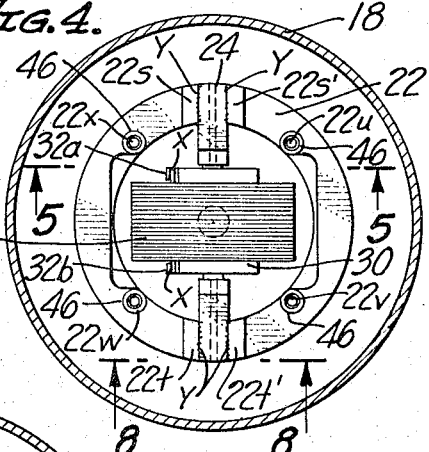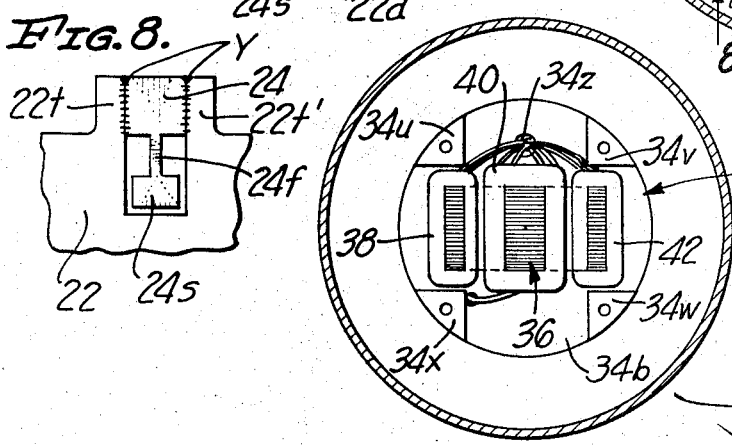

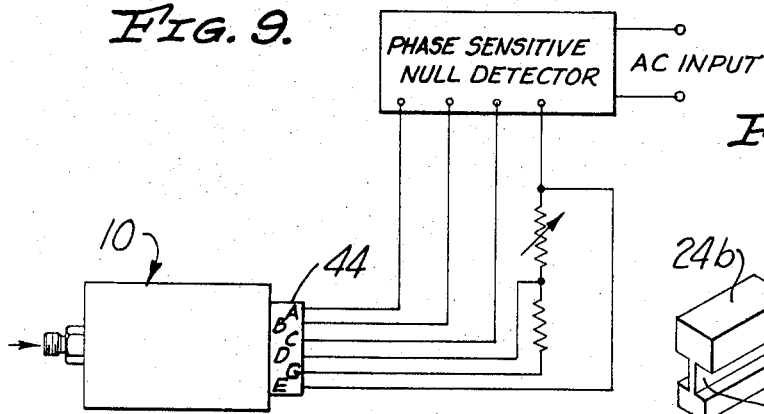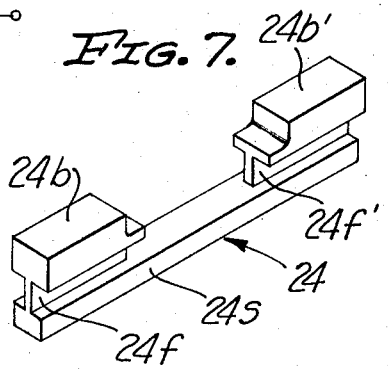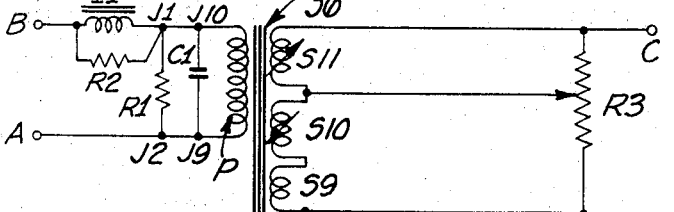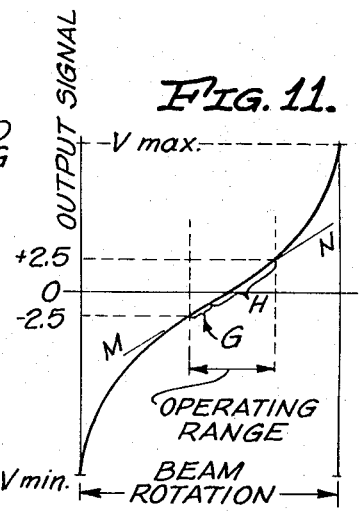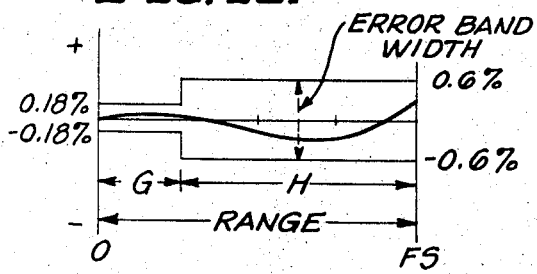

1

3,421,126
VARIABLE RELUCTANCE TRANSDUCER
John E. Ames, Jr., Riverside Calif., assignor to Bourns, Inc., a corporation of California
Filed May 8, 1967, Ser. No. 636,868
U.S. Cl. 336—30          7 Claims
Int. Cl. H01f 21/02; H01f 21/06; G01l 9/00

ABSTRACT OF THE DISCLOSURE

A transducer for transducing changes of a physical quantity (such as a pressure difference exhibited at opposite faces of a deformable diaphragm) into corresponding changes of an A.C. signal, in which transducer the diaphragm or like sensor is mechanically connected to rock a magnetic armature in the form of an I-core relative to a stationary magnetic E-core to change the magnetic reluctance of magnetic flux paths linking the core and armature, the mechanical connections being direct and substantially lossless, and the core having energizing input coil means comprising a primary coil, and output signal coil means formed by sets of secondary coils, the output connected to a closed-loop A.C. series system using a reference voltage supplied by one output coil set and a produced signal voltage produced by another secondary coil set and the signal varying according to sensor displacements, the voltages being useful in an adjustable summing network comprising a null indicator which gives a null indication when the displacement-representing voltage signal equals a prescribed or determinable fraction of the reference voltage signal.

---

The prior art contains disclosures of transducers utilizing energized variable-reluctance magnetic core and coil means for transducing changes of a physical condition (e.g., pressure) to corresponding changes of an electrical signal. Therein the magnetic core means is comprised of fixed core means and translatory core means actuated by sensor means such as a diaphragm. Typical of such prior art disclosures are those of U.S. patents to Mestas, No. 2,408,524, to Hornfeck, No. 2,564,221 and to Johannson, No. 3,126,518, and those of a publication entitled "Variable Reluctance Pressure Transducers," by Saul Epstein, and a publication entitled "Reluctive Pressure Transducers," by Harry N. Norton. The prior art transducers of the noted type are characterized by one or more undesirable features among which are: relatively large size, undesirably heavy, inability to successfully withstand vibration and shock, inability to operate satisfactorily in a high temperature environment, necessity for two E-cores (with attendant increase of size and weight) or other complex construction, lack of adjustability, undesirable sensitivity to changes of ambient temperature and/or lack of temperature compensation, and lack of an acceptable degree of linearity of output with change of pressure or other physical quantity being sensed.

In contrast with the noted prior art transducers, that of the present invention is of simple construction, compact, having a minimum of parts involving no loose mechanical connections, having the moving parts of dynamically balanced construction and capable of successfully withstanding extended extensive vibration and severe shock, and having excellent immunity to temperature-variation effects and excellent linearity of output within a very narrow error band. Also, the transducer of the invention comprises no active electrical components such as are found in prior art transducers for the same purposes and using amplified small signals from the transduction element, and it comprises means whereby the total accuracy may be improved at either end of the operating range, that is, the error band may be made to be narrow (high degree of accuracy) at, for example, the lower end of the operating range; and made to be wide (lower degree of accuracy) at the other end of the range. Briefly, the present invention provides, in closely confined relation in a housing, a translatory member (such as a center portion of a pressure-sensitive diaphragm) having a component or portion subject to linear movement or translation to and fro along an axis (here termed the axis of translation or instrument axis) in response to variations in the physical quantity (such as pressure) to be measured, a yoke rigidly connected to the sensor component or translatory portion or component so as to move therewith, a magnetic armature device preferably of "I-core" character, mounted on flexural pivots for rocking motion about a second or pivot axis generally transverse of the axis of translation, the armature device having an integral connection with a flexible connecting part of said yoke and spaced or offset from both of said translational and pivot axes, a rigidly fixed magnetic E-core having a center limb and outer limbs connected by a base and having its outer limbs adjacent respective end portions of the pivotally supported I-core armature, energizing, output and other electric coils magnetically linked to the magnetic flux paths extending through the limbs of the E-core, and appurtenant electrical circuit means functionally related to the coils. The armature is rocked about the axis provided by the flexural pivots incident to translation of the sensor component, and in so rocking, changes the relationship of the magnetic flux paths linking the coils and the potentials induced in the secondary coils. The armature device is dynamically balanced about the second or pivot axis, whereby shock and acceleration effects are made to be insignificant. The movable parts are very small and rugged and are so arranged as to have an extremely high natural frequency of vibration. The off-axis or off-center connection of the sensor and yoke to the pivotally mounted armature device permits gross reduction of the space that would otherwise be required by those members and mechanism connecting the translatory member to the pivotally-supported armature. Means are provided whereby precise but adjustable spacing of the armature from the E-core is attained and production of many instruments of substantially identical performance and characteristics is facilitated. The spacing is effected by shim means.

Electrically, the transducer comprises a primary circuit effectively to energize the magnetic circuit, secondary means sensitive to movement of the armature, a secondary for providing a reference voltage for the external nulling circuit, and secondary circuit means for adjustment purposes and compensation, and necessary connection means. The circuit is arranged for connection in a closed-loop A.C. series system. In the system externally of the transducer the reference voltage is resistively divided to supply a defined or determined fraction of the sensor secondary voltage signal. The two voltages are connected in a summing network comprising a null detector whereby when the sensor signal equals the determined fraction of the reference voltage an in-phase null is obtained. For sensor movements in a first direction, producing a sensor signal in excess of the reference signal, an output signal voltage that is in phase with the sensor signal appears across the null detector. When the sensor movement is in the opposite direction from the neutral or null attitude, the output signal voltage is out of phase with respect to the sensor signal. The voltage deviations thus apparent across the null indicator may be used for control purposes in the closed loop series system of which the present transducer is only a part.

The invention has as a principal object to provide a transducer of the type hereinbefore indicated in which optimum results are attained in respect of compactness, immunity to undesirable effects incident to vibration, shock, temperature change and long-term usage.

Another object of the invention is to provide a differential transformer type of transducer having means for readily adjusting the scale factor of the output signal.

Another object of the invention is to provide a differential transformer transducer in which the translatory portion of the sensor means is integrally yoked to an I-core to rotate the latter relative to the legs of an E-core by substantially lossless connections, using flexural pivot means.

Other objects of the invention are hereinafter set out or made evident in the claims and following description of the preferred embodiment of the invention illustrated in the drawings, in which:

FIGURE 1 is a plan view of a complete exemplary transducer according to the invention, to no particular scale, with portions broken away to illustrate details, the transducer selected for illustration being a pressure transducer arranged to provide signals representative of absolute pressure;

FIGURE 2 is a longitudinal view, partly in section, of a portion of the transducer depicted in FIGURE 1, illustrating the arrangement of a translatory portion of a pressure-sensitive sensor element relative to an I-core and its cradle or rocking mount, the scale being larger than that of FIGURE 1;

FIGURE 3 is a fragmentary longitudinal view, partly in section, similar to a portion of FIGURE 2 but taken on a plane at right angles to that of the section of FIGURE 2, depicting the mounting of flexural pivot means for the movable cradle and I-core of the transducer and the positional relationship of fixed and movable magnetic components, the sections being taken as indicated along line 3—3 in FIGURE 2 and the fixed magnetic component indicated in broken lines;

FIGURE 4 is a transverse sectional view, illustrating the arrangement of the rockable mount for the I-core of the transducer, and the disposition of the mount or cradle and the contained I-core of the unit, the section being taken as indicated at line 4—4 of FIGURE 2;

FIGURE 5 is a fragmentary sectional view showing details of one of a pair of integral opposed but axially-aligned flexural pivots which are integrally united to the frame and body of the transducer, and the structural arrangement of the integral union;

FIGURE 6 is a transverse sectional view of the transducer, viewed toward the face ends of the E-core limbs and the core windings and showing those components and the stationary surfaces against which adjusting means are disposed for regulating the spacing of the I-core from the E-core and the angular relationship therebetween;

FIGURE 7 is a pictorial view, to no particular scale, showing an integral beam structure comprising flexural pivot means;

FIGURE 8 is a fragmentary view showing how the structure depicted in FIGURE 7 is united with the frame of the transducer;

FIGURE 9 is a schematic diagram depicting connections of the transducer circuitry to an external circuit including a phase-sensitive null detector;

FIGURE 10 is an exemplary circuit diagram showing exemplary signal and excitation windings on the magnetic core of the transducer, with appurtenant circuit components;

FIGURE 11 is a graphical representation showing the relationship between output signal voltage and sensor translation as converted into rotation of the rocking beam of the transducer; and FIGURE 12 is a graphical representation of an exemplary permissible-error band and the error characteristics of the exemplary transducer illustrated in FIGURE 1.

As illustrated in FIGURES 1 and 2, the exemplary differential transformer transducer is in the form of a pressure transducer 10 having at one end a pressure fitting 12 via the bore 12b of which fluid under pressure to be sensed is admitted to an interior chamber 14. The pressure fitting is formed to have circumferentially welded thereto a housing-end in the form of a disc 16 which in turn is welded to one end of a cylindrical sleeve 18, the latter forming a principal component of the housing which encloses principal operating and electrical components of the transducer.

The pressure fitting 12 has peripherally welded thereto at an annular fluid-tight juncture 20, a cylindrical flange portion of a body member 22. Body member 22 comprises an integral disc-like center portion at one end thereof to provide a pressure-sensitive diaphragm 22d having an "outer" or forward surface exposed to the fluid admitted under pressure to chamber 14. The center portion of the diaphragm thus provides a means or device which moves linearly along the axis of translation through distances representative of the variations in the physical quantity being sensed, which in the example is the pressure variation in the fluid in chamber 14. Basically, the structure thus far described is or may be old in pressure transducers and is not, per se, the present invention.

The body member 22 is provided at diametrically opposite sides with respective pairs of rearwardly (away from the diaphragm) extending spaced stands 22s, 22s' and 22t, 22 t' (FIGURE 4). The opposed sets of spaced-apart stands are provided to support and rigidly mount respective ends of a flexural pivot structure 24 (FIGURE 7) which preferably is an integral device formed by milling away upper and web portions of a rail-like beam as shown, whereby the pivot structure comprises an elongate bar-like support 24s to which are connected by thin resilient flexural webs 24f, 24f', respective bases 24b, 24b'. Bases 24b and 24b' are formed to be tightly received between respective pairs of the noted stands, as indicated in FIGURES 3, 4 and 8. As is indicated in FIGURES 4 and 8, the bases of the pivot beam are welded, each to both of its embracing stands, along next-adjacent corner edges indicated by the symbol Y. Thus the pivot means 24 is firmly supply at its end portions, and has its rail 24s extending transversely across the body member adjacent to, but spaced from, sensor 22d. Thus supported, rail 24s may rock about an axis which is parallel to the common centroidal axis of bases 24s, 24s', and which extends along or through the elongate resilient springs provided by webs 24f and 24f'.

A magnetic armature 28 (FIGURES 3 and 4) is firmly supported in a strong cradle 30 which in turn is affixed, as by welding, to flexural pivot rail 24s, as indicated in FIGURES 3 and 4. The armature, in the form of an I-core comprised of a multiplicity of flat thin laminae of magnetic material adhesively bonded into elongate block form, is thus fixedly secured to cradle 30 and is accordingly supported for rocking motion about the flexural pivot provided by the resilient webs 24f, 24f'. As will presently be made fully clear, such rocking of the cradle and armature (herein collectively termed the "beam") is made to occur in response to translation of the sensor, and is made to result in concurrent increase in the magnetic reluctance of one magnetic flux path and decrease in the reluctance of a similar magnetic flux path, whereby differential transformer effects are produced representative of displacements of the sensor.

For the purposes noted, a lossless resilient mechanical connection is provided between the sensor element or device (herein shown in FIGURE 3 as a protruding button 22e on the center of diaphragm 22d) and the cradle 30. The mechanical connection must be such that cradle 30 is caused to rock about the transverse axis provided by the pivot means, while button 22e partakes of rectilinear motion; and, to attain the noted objective of extreme compactness with concurrent freedom from adverse effects from shock and vibration, the connection must be displaced from the translational axis of the transducer sensor element. Thus a centrally apertured yoke member 32 (FIGURE 3) is fitted on button 22e and welded thereto. Yoke member 32 has two thin resilient yoke horns 32a, 32b (FIGURE 2) which, as indicated in FIGURES 3 and 4, are joined at their outer extremities to respective corner edges of cradle 30 at points indicated by the mark X. The adjacent end face of the cradle is beveled as indicated in FIGURE 3, to provide clearance between the yoke horns and the cradle as the latter rocks incident to translation of the horns.

Mounted on the rear exposed face of member 22, and secured thereto by four screws turned into respective tapped holes 22u, 22v, 22w and 22x (FIGURE 4) formed in the rearwardly-extending cylindrical wall portion of member 22, is a frame 34 (FIGURE 6) which is formed to have a generally flat circular body 34b with four outstanding triangular legs 34u, 34v, 34w and 34x, each of which has a bolt-hole longitudinally therethrough for registry with a respective corresponding one of the noted tapped holes 22u, 22v, 22w and 22x (FIGURE 4) in the body member 22. The ends of the four legs of the frame are preferably accurately positioned relative to the flat circular rear face 22m (FIGURE 3) of body member 22.

Disposed in the space between the outstanding legs of frame 34 is an E-core 36 (FIGURE 6) formed of a set of adhesively bonded thin flat laminae of E-shape, made of magnetic material. The limbs of the E-core have mounted thereon sets of coils 38, 40 and 42 of insulated wire, as indicated in FIGURE 6, and electrical details of which coils are hereinafter described. The E-core is accurately seated with the base of the core in a complementary recess 34r (FIGURE 3) provided in body 34b of frame 34, and affixed in place therein with adhesive, the limbs of the core being disposed parallel to the translational axis of the transducer and as indicated in dotted lines in FIGURE 3. As indicated in FIGURE 3, the ends of the three limbs of the E-core may be disposed in a common plane and are disposed close to an adjacent face of armature core 28. Thus as is there made evident, when the armature is rocked about its axis provided by the flexural pivot webs 24f, 24f', one end of armature core 28 approaches one end limb of E-core 36 as the opposite end recedes away from the opposite end-limb of the E-core, and vice versa; a middle portion of the armature core remaining closely adjacent to the middle limb of the E-core irrespective of the direction of rocking of the armature. As is evident, the reluctance of the magnetic-circuit or loop comprising the outer E-core leg toward which an end of the armature core is rocked is reduced, while the reluctance of the loop which comprises the opposed outer E-core leg is increased. Thus, by energizing the E-core and suitably disposing and connecting several secondary coils, novel results are attained in respect of electrical output signal, as will presently be explained.

In the case of transducers of the type here of concern, it is desirable to be able, with a single general arrangement of parts, to accommodate differing ranges of sensor element translation, or of pressure change, or other like physical change which is under measurement. Thus in the presently disclosed exemplary transducer, it is of advantage to be able, by making the diaphragm portion 22d of any of different thicknesses, to provide for accommodation of different pressure ranges, e.g., 0–500 p.s.i., 0–1500 p.s.i., and 0–3000 p.s.i. Similarly, it is desirable to be able to accommodate, in the magnetic-core arrangement, adjustments in spacing of the movable or armature core relative to the stationary or E-core whereby the output signal span of the instrument may be made optimum, for example, from −2.5 volts to +2.5 volts. In the exemplary illustrated structure, the frame 34 may be variously spaced from member 22 by selections among from one to four sets of thin shims such as shims set 46 (FIGURE 4), the individual shims being of thin non-magnetic metal and of washer-like configuration. Each set of shims is disposed in registry with a respective one of the tapped holes 22u, 22v, 22w and 22x so as to receive therethrough the respective bolt or screw. The appropriate number of shims (or shim-laminations) is used at one or more of the holes, whereby the desired extent of air gap is attained between the respective ends and sides of core 28 and corresponding adjacent ends and sides of the E-core 36. Since the E-core structure is energized with A.C. excitation to provide an alternating magnetic field pattern, it is evident that the range or "span" of the signal generated in any or all of the "secondary" coils can thus be regulated, without variation of the number of turns in the respective coils and without change of either of the core constructions, all in accord with the number of shims and the dispositions thereof.

Coils are formed of insulated wire and secured by adhesive on the legs of the E-core, whereby the core structure is rigid and may be energized by an A.C. current supplied to the primary coil, and whereby displacements of the armature or I-core result in the production of an output signal representing the displacement of the armature-actuating sensor device such as button 26e. The coils, and appurtenant electrical components contained in the transducer housing, are schematically portrayed in FIGURE 10. Referring to that figure, the several legs of the E-core are schematically represented collectively by core 36. A primary coil P is disposed on the center legs of the E-core, connected to junctions J9 and J10. The latter junctions are connected, as shown, to respective junctions J1 and J2, between which junctions a resistor R1 is connected in parallel with a capacitor C1 that is connected between junctions J9 and J10 and in parallel with primary coil P. Alternating current energy of selected voltage is supplied to input terminals A and B from any suitable regulated A.C. source. Terminal B is connected to junction J1 by a parallel network comprising inductor I1 and resistor R2; and terminal A is connected directly to junction J2 as shown. Thus A.C. wave energy to excite primary coil P is supplied, and the desired phase relationship thereof relative to secondary output signal voltage (presently described) is attained largely by the inductor I1 and capacitor C1, and closely adjusted by adjustment of resistors R1 and R2.

As indicated in FIGURE 10, eleven secondary windings or coils, labeled S1, S2, S3, S4, S5, S6, S7, S8, S9 S10 and S11, respectively, are disposed on the E-core 36. Of the windings or coils, S1, S2, S3, S4, S7, S8 and S9 are disposed as members of group 40, on the center leg or limb of the core. Coils S6 and S11 are disposed on that outer leg of the core next adjacent to yoke 32a, as coils of group 42; and coils S5 and S10 are disposed on the other outer leg of the E-core, as coils of group 38. As is indicated in FIGURE 6, respective pairs of insulated conductor leads extend from the several coils, are brought together as a group or cable and extend through an aperture 34z in the base portion of frame 34. In a chamber at the electrical-connector end of the transducer housing 18, inwardly of connector socket 44 (FIGURE 1), the several conductors from the coils are connected to terminal pins on an insulation circuit board, at which region the connections indicated in FIGURE 10 are made. The aforementioned resistors, inductor and capacitor, and other discrete components hereinafter described in connection with the electrical circuitry of the transducer, are mounted in a way known in the art, on the circuit board in the housing; and external circuit connections are made to pins of connector socket 44. The cricuit board, not shown in detail, may be of any convenient compatible shape, and is per se not of the present invention.

Mounted on the aforementioned circuit board, or, alternatively, merely potted with the insulated conductors in the chamber adjacent the connector end of the transducer housing, and connected to respective secondary coil circuits, are first, second, third and fourth variable resistors R3, R4, R5 and R6, and other resistors R9, R10, R11, R12, R13, R14 and R15, and a capacitor C2. Certain of the resistors are temperature-sensitive. For example, resistors R11 and R15 are thermistors, and resistors R9 and R13 are Balco wire. The connections are as indicated, with insulated conductors extending from the several components to respective pins of the connector 44 to provide terminations A, B, C, D, E and G at the connector, whereby a phase sensitive null detector and an A.C. power supply can be connected to the transducer circuits as indicated in FIGURE 9.

The functional operation of the circuitry in the transducer is that of a differential transformer circuit which is arranged to provide a zero-volt output signal at a sensor displacement such that the magnetic armature is in middle or neutral position (that is, when the magnetic paths through the respective outer legs of the E-core are balanced or of equal magnetic reluctance), to provide an out of phase potential at zero sensor displacement, a zero-volt signal at an intermediate sensor displacement and an in phase potential signal at maximum sensor displacement. Thus the arrangement is such that at the lower or minimum end of the displacement range of the sensor (zero pressure, in the case of the exemplary pressure transducer), the next output signal is out of phase; and as the sensor is translated increasingly toward the maximum end of the displacement range the output signal approaches and passes through zero value and then increases to a positive in phase value. The relationship of the signal to rotation of the armature or "beam" of the transducer is schematically displayed in FIGURE 11, wherein it is indicated that with the beam rocked to the limit of travel in one direction (at which the diaphragm 22d is in neutral and relaxed position), the output signal is at a large negative value $V_{min}$ and with the beam rocked to the other extreme limit of travel, the signal is at a large positive value $V_{max}$.

As indicated in FIGURE 11, and as is well understood by those skilled in magnetic devices, the output signal is not linear with respect to beam rotation. As it is desired to have the output signal as nearly linear with respect to sensor displacement as is feasible, the sensor and magnetic means are so arranged that in sensing through the desired range of physical quantity (pressure, displacement, etc.), the rocking armature or "beam" is rotated through approximately equal arcs of approach and recession from a neutral attitude or mid-position relative to the E-core. Further, the arrangement is so chosen that only a relatively small portion of the possible extent of movement of the beam is used, as a result of which only a relatively straight portion of the characteristic curve is swept through as the sensor moves over its full range of movement, whereby a considerably closer approach to linear output may be attained. Thus, in the exemplary transducer, the diaphragm is so dimensioned and constructed relative to the dimensions of the armature and the yoke-connection to the cradle, and the coils are formed and the spacing of the magnetic parts so chosen, that a practical minimum of rocking movement of the beam is required to accommodate the desired pressure range and still use only a reasonably linear middle portion of the output signal characteristic curve. Thus the used portion of the total range of rotation of the armature or beam is, for example, that indicated as the "operating range" in FIGURE 11, whereby, as is there made evident, only the straighter mid-portion of the signal voltage-beam rotation characteristic is used.

It is in instances desired to have the output signal of a transducer be more nearly error-free over a certain portion of the range of the instrument, while the accuracy need not be as great over the remainder of the range. In the case of a pressure transducer, for example, it may be desirable to restrict the "error-band" within which the transducer should operate, to a much smaller band-width or maximum permissible error through the lower portion of the range, and permit or allow a greater percentage error over the upper portion or remainder of the range. Illustratively, and referring to FIGURE 12, the permissible error band within which the exemplary instrument is desired to be operable is illustrated as the band or region comprised between upper and lower limits indicated and which limits vary between +0.18% and −0.18% of full scale pressure over the lower one-fourth of the range of the instrument, and which limits vary between the more liberal values +0.6% and −0.6% over the upper three-fourths of the range. Thus it is evident that in the noted circumstance, it is desirable that the output signal-voltage track or follow more closely the perfectly linear hypothetical characteristic M–N (FIGURE 11) over the lower portion (G) of the operating range, and that the signal non-linearily be permitted to more widely deviate from the hypothetical value over the upper portion (H) of the range. To accommodate that desideratum, the angular and spatial disposition of the armature core relative to the ends of the legs of the E-core are adjusted by interposing an appropriate measure of shims 46 between the frame 34 and the body 22 at each of the holes 22u, 22v, 22w and 22x previously described. Such adjustment has the effect of changing the relationships and extents of the air-gaps of the magnetic loops and of shifting the "zero" point of the output signal upwardly or downwardly on the characteristic curve; and consequently of effectively straightening the lower portion of the curve encompassed in the operating range of the instrument at the expense of including a more sharply curved portion of the characteristic in the upper part of the operating range. Thus the more sharply-curved portion of the output signal graph, over wihch the deviation from a linearly varying signal is greatest, may be made to encompass the upper portion of the range of the transducer, and the curvature and deviation from the desirable straight-line or linear characteristic within the lower portion of the range considerably reduced. Selective use of shims between the frame 34 and member 22 thus permits, in effect straightening the signal voltage/armature-rotation characteristic curve over a desired lower fraction of the total range, at the expense of decreasing the linearity over the remainder of the range. As is obvious, the upper portion of the range may be made to be more nearly error-free in the manner indicated. As was previously noted, it is, especially in the case of pressure transducers, of considerable value to be able to thus improve the linearity of the operating signal characterictics over the lower portion of the operating range of the instrument.

The several secondary windings disposed on the E-core are for providing an output signal which is representative of translatory movement of the sensor, and for providing a reference potential, and for effecting various compensations or corrections. The electrical arrangement of the coils, and the circuit connections, are not per se of the present invention and are more completely described and explained in a concurrently filed copending companion application of the present applicant, for Letters Patent entitled "A.C. Apparatus Temperature Compensation," Ser. No. 636,701, filed May 8, 1967. Therein the method whereby compensation for the effects of variations in ambient temperature upon the output signal of the transducer are explained; and to the extent that disclosure is necessary to a complete understanding of all details of the transducer of the present invention, the disclosure of the noted companion is incorporated herein by reference and may be referred to as may be required or necessary.

In the light of the foregoing disclosure of details of an exemplary transducer incorporating the principles of the invention, changes within the true scope and spirit of the invention will occur to others, and accordingly it is desired that the invention be not restricted to details of the exemplary device other than as may be required by the appended claims.

I claim:

1. A variable reluctance transducer adapted to transduce translational displacements of a sensor into corresponding changes in A.C. potential, said transducer comprising:

first means, including stationary supporting means and a sensor having a translatory device movable along and defining an axis of translation relative to the supporting means incident to variations of a physical quantity to which the sensor is sensitive, said first means being effective to restrict movement of said translatory device to movements along said axis of translation;

second means, including flexural pivot means secured to said stationary supporting means for support thereby and having flexible means providing a pivot axis extending transversely of said axis of translation and having a rockable portion arranged for rocking motion about said pivot axis;

third means, including means secured to said rockable portion of said flexural pivot means for rocking movement therewith about said pivot axis and comprising an elongate magnetic armature core disposed with its longer dimension generally transverse to both of said axes;

fourth means, including magnetic E-core means affixed to said supporting means and having outer limbs and a middle limb and arranged with the ends of the outer limbs thereof closely adjacent to respective ends of said armature core to form therewith a set of magnetic flux paths having air gaps and the reluctances of which flux paths vary oppositely incident to rocking of said armature core;

fifth means, including a primary transformer winding linking said E-core means for energizing said magnetic flux paths, and at least one secondary winding linking a portion of said magnetic flux paths for deriving an output signal; and sixth means, including flexible means integrally connecting said translatory device to said rockable portion in a region laterally displaced from said axis of translation and laterally displaced from said pivot axis, for translating translatory movements of said armature core without lost-motion whereby the space required by said first, second, third, fourth and fifth means is a minimum and whereby precision of translation of such translatory axial movements into equivalent A.C. signals is attained.

2. A variable reluctance transducer according to claim 1, in which said fourth means comprises sets of shims disposed between said supporting means and said E-core means at a plurality of spaced-apart places, whereby the disposition of said E-core relative to said armature core can be selected for optimum translation of said translatory axial movements into equivalent A.C. signals.

3. A variable reluctance transducer according to claim 1, in which said sensor is a pressure-sensitive diaphragm having a central button and in which said sixth means includes a yoke member having a portion integrally united with said diaphragm about said axis of translation and having a thin resilient strip-like portion having an extremity and extending generally parallel to said axis of translation but laterally displaced therefrom, and said extremity fusion-united to said third means for rocking the latter without loss of motion, incident to axial movement of said button.

4. A variable reluctance transducer adapted to transduce translation displacements of a rectilinearly movable member along an axis of translation into corresponding changes in an A.C. potential, said transducer comprising:

first means, including such movable member and stationary means effective to provide a plurality of points of support and to constrain said movable member to movements along said axis of translation;

second means, including a rockable armature device comprising a magnetic member, and pivot means pivotally supporting said armature device on said first means, said armature device being integrally connected with said movable member so as to be rocked incident to translational displacements of said rectilinearly movable member;

third means, including magnetic core and coil means disposed to form and lie within an alternating magnetic field including said magnetic member, whereby incident to rocking of said armature device changes in said magnetic field occur with coincident changes of potentials induced in said coil means; and fourth means, including fastening means at said points of support, effective to secure and hold said magnetic core and coil means to said first means and stationary relative thereto, said fourth means comprising means for variably adjusting the spacing of said magnetic core and coil means from said magnetic member, whereby the air gaps separating portions of said magnetic member from respective adjacent portions of said magnetic core and coil means may be adjusted to provide any of a multiplicity of desired magnetic-field relationships therebetween.

5. A transducer according to claim 4, wherein said first means includes a pressure-sensitive diaphragm and said rectilinearly movable member is a structure integral with a central portion of said diaphragm and in which the outer periphery of said diaphragm is circular and is integrally united with said stationary means, and in which transducer an integral connection is provided between said rockable armature device and said movable member, said connection being rigid in directions parallel to said axis of translation and resilient in a direction transverse to said axis, and said integral connection being laterally offset from said axis of translation, whereby a minimum of space is occupied by said transducer.

6. A variable reluctance transducer for translating rectilinear movements of a device along an axis of translation into equivalent variations of an alternating electric potential, said transducer comprising in combination with said device:

first means, including a rigid supporting structure and means for defining said axis of translation and constraining movements of said device to movements along said axis, said supporting structure providing a plurality of points of support;

second means, including a rigid supported structure and attaching means at each of said points of support effective to secure said supported structure to said supporting structure, said attaching means including means for adjusting the positional disposition of a principal surface of said supported structure relative to said supporting structure;

third means, including a magnetic E-core and insulated electric conductor coils fixedly mounted thereon for producing an alternating magnetic field and generating A.C. potentials, rigidly affixed to said supported structure and disposed approximately symmetrically with respect to said axis and transversely thereof with the three limbs thereof directed toward said device;

fourth means, including an armature structure including a magnetic armature core disposed substantially symmetrically relative to said axis and transversely thereof and mounting means including flexural pivot means supporting said armature structure for rocking movement about a pivot axis transverse to said axis of translation and said armature core arranged for variable interaction with a magnetic field linking said E-core incident to rocking of said armature structure about said pivot axis; and fifth means, including yoke means rigidly affixed to said device for translational movements therewith, said yoke means comprising an elongate member disposed generally parallel to but laterally displaced from said axis of translation and having flexural resilience in a direction transverse of said axis of translation but stiffness in a direction parallel to said axis of translation and said member having an end integrally united with a portion of said armature structure at a location laterally displaced from said axis of translation and displaced from said pivot axis, whereby rectilinear movements of said device are translated into rocking movements of said armature core to effect variations in said magnetic field and corresponding variations in A.C. potentials generated in said coils, incident to energization of at least one of said coils.

7. A variable reluctance transducer adapted to translate rectilinear displacements of a movable device along an axis of movement into corresponding changes of A.C. electric potential of an output signal utilizing electromagnetic variable reluctance transduction means for the translation, said transducer comprising:

first means, including a rigid supporting structure and a rectilinearly movable device having movements relative to said supporting structure in opposite directions along an axis of movement;

second means, including frame means adapted to be supported by said supporting structure, said second means further including magnetic core means affixed to said frame means, and coil means affixed on said magnetic core means for electromagnetic coaction therewith to produce an alternating magnetic force and generate alternating electric potentials, said core means having a plurality of pole faces arranged for creation of an alternating magnetic field thereadjacent;

third means, including a rockable magnetic armature device comprising an armature core having ends disposed adjacent respective ones of said pole faces, said third means further including flexural pivot means affixed to said supporting structure and to said armature device to support said armature core for rocking movement of the ends thereof toward and away from respective ones of said pole faces;

fourth means, including resilient means integrally connecting said movable device to said armature device to rock the latter and said armature core incident to rectilinear displacement of said movable device relative to said supporting structure; and fifth means, including adjustable means for rigidly securing said frame means to said supporting structure at a plurality of places not on said axis of movement, whereby the spatial disposition of said pole faces relative to the magnetic center of said armature core can be adjusted to control the linearity of A.C. electric potential of an output signal generated in said coil means incident to generation by said coil means of an alternating magnetic field.

References Cited

UNITED STATES PATENTS

| | | | |
|---|---|---|---|
| 2,563,899 | 8/1951 | Wiancko | 336—30 |
| 2,758,288 | 8/1956 | Shannon et al. | 336—30 |
| 3,184,651 | 5/1965 | Albosta | 336—134 XR |

FOREIGN PATENTS 159,395   8/1940   Germany.

LEWIS H. MYERS, *Primary Examiner.*

T. J. KOZMA, *Assistant Examiner.*

U.S. Cl. X.R.

73—398; 323—51; 336—134, 135, 184